United States Patent Office

Re. 26,609
Reissued June 17, 1969

26,609

ALUMINUM CLEANING COMPOSITIONS

James W. Carroll, Lafayette Hill, and Harold V. Smith, Philadelphia, Pa., assignors to Pennsalt Chemicals Corporation, Philadelphia, Pa., a corporation of Pennsylvania No Drawing. Original No. 3,255,118, dated June 7, 1966, Ser. No. 163,064, Dec. 29, 1961. Application for reissue Aug. 19, 1968, Ser. No. 764,350
Int. Cl. C11d *3/04;* C23f *7/08*
U.S. Cl. 252—137 6 Claims

Matter enclosed in heavy brackets [ ] appears in the original patent but forms no part of this reissue specification; matter printed in italics indicates the additions made by reissue.

*ABSTRACT OF THE DISCLOSURE*

*Compositions for cleaning aluminum or aluminum alloys containing an alkali metal tetraborate, an alkali metal polyphosphate, a hexavalent chromium compound in the form of a water soluble salt selected from chromic acid and alkali metal chromates and dichromates, and an organic detergent selected from a sodium salt of a sulfonated condensation product of naphthalene and formaldehyde, an alkyl aryl sulfonate, and an alkyl phenol-ethylene oxide condensate. The cleaning composition may also contain an aluminum sequestrant.*

This invention is directed to new cleaning compositions for use on aluminum or aluminum alloys comprising an alkali metal polyphosphate, an alkali metal tetraborate and hexavalent chromium in the form of a water soluble salt in specific proportions.

Our invention also embodies aluminum cleaning compositions comprising an alkali metal polyphosphate, an alkali metal tetraborate, hexavalent chromium as indicated above and one-half to five parts by weight of at least one organic detergent selected for its ability to remove soils encountered in the processing of aluminum metal or to prevent the redeposition of such soil. The organic detergents having a special utility in the cleaning of aluminum or its alloys are condensed naphthalene sodium sulfonate, alkyl aryl sulfonic acids, and their alkali metal salts and alkyl phenol-ethylene oxide condensate.

In one form of our invention the cleaner composition comprises an alkali metal polyphosphate, an alkali metal tetraborate, hexavalent chromium in the form of a water soluble salt in specific proportions, together with an aluminum sequestrant.

The most efficient aluminum cleaners of our invention comprises an alkali metal polyphosphate, an alkali metal tetraborate, hexavalent chromium, at least one of the specific organic detergents, together with one of the aluminum sequestrants.

Our invention also includes the use of the above composition in aqueous solution to effect cleaning of aluminum and aluminum alloys.

Industrial metal cleaners are usually based upon strong alkalis such as caustic soda, sodium orthosilicate or trisodium phosphate compounded with detergents and/or sequestering agents. In the cleaning of aluminum such products cannot be used because the strong alkaline materials will seriously corrode or etch the aluminum. For this reason aluminum cleaners in the past have usually been compounded with silicates which are milder alkalis and which also provide a silicate film which inhibits the corrosion of aluminum by any strong alkali which might be present. Sodium metasilicate, for example, is a good detergent which is widely used in aluminum cleaners.

Many aluminum cleaning operations precede a subsequent etching, anodizing or chemical brightening operation. In such treatments, there is a serious disadvantage in using sodium metasilicate in the prior cleaning operation. The silicate forms a protective film on the aluminum which remains and interferes with uniform etching, anodizing or chemical brightening of the metal.

To overcome this disadvantage it is usually necessary to dip the metal which has been cleaned in a cleaner containing a silicate in an acid before proceeding with the processing of the metal. An example of aluminum cleaner container a silicate followed by an acid treatment is that shown in U.S. Patent 2,709,847. The use of an acid dip in the processing of aluminum metal requires additional equipment, chemicals and material handling, which adds considerably to the cost of processing the metal.

Accordingly, it is one of the objects of this invention to formulate an alkaline cleaning composition for use on aluminum which will not etch the aluminum and which will not leave a film on the aluminum which requires a chemical operation to remove before aluminum can undergo further chemical processing.

Many cleaners heretofore used in processing aluminum alloys have been based primarily on sodium hydroxide, sodium carbonate or sodium bicarbonate and it has been found that such cleaners are unstable in use, particularly in regard to pH and in the control of the pH. Since aluminum cleaners cannot be too alkaline, in order to prevent etching, the pH must be controlled within a fairly close range. When the above chemicals are used to provide alkalinity and detergency, there is no inherent resistance to a lowering of pH when cleaning acid type soils, and hence the baths are of short life or become unstable.

We have now found that by the use of alkali metal polyphosphates and alkali metal tetraborates, in specific ratios, our cleaners have the desired pH range, and, in addition, have an inherent stability to resist changes in pH due to acid contaminants for a long period of time.

It is also necessary in aluminum cleaners to provide an inhibitor against corrosion. The prior art has used various materials as inhibitors, such as arsenic and antimony salts, as disclosed in U.S. Patent 2,303,399. We have found that hexavalent chromium is a desirable inhibitor for our aluminum cleaning compositions. As mentioned before, the use of silicates is undesirable because of the separate acid treating step to remove the silicate film. The use of antimony and arsenic salts is undesirable because of the toxicological problem and cost.

There are quite often present on the aluminum alloys soils which are not easily or completely removed by the detergency provided by alkaline compounds. To remove them some aluminum cleaners have incorporated solvents such as tertiary butyl alcohol as disclosed in U.S. 2,762,732. Mineral spirits, such as heavy naphtha, have also been used for this purpose. In some cases the prior art has used a separate solvent cleaning operation to remove specific soils from the aluminum. In U.S. Patent 2,705,500 the patentee discloses the use of trichloroethylene as a separate degreasing step prior to the use of an alkaline cleaning operation.

The most prevalent soils which contaminate the aluminum metal are cutting or stamping oils and buffing compounds. These materials must be completely removed if the metal is to undergo a subsequent anodizing, etching or chemical brightening treatment. Thus, it is quite a problem to obtain detergent systems which will function properly within the desired pH range for many weeks and which will thoroughly remove all types of soil encountered in the processing of aluminum alloys.

There is an additional problem in the processing of aluminum which increases the complexity of choosing suitable detergents. The soil that is removed during the chemical cleaning operation must be prevented from redepositing upon the metal as a grease or as a stain. It is not enough that the metal must be cleaned while it is in the cleaning solution; it must remain clean until it has passed through the subsequent rinsing stage. If the aluminum is soiled or stained, it would be unsuitable for architectural applications such as for window frames or doors. Another problem in formulating a metal cleaning composition is to select the materials which will operate satisfactorily in the great varieties of water encountered in different sections of the country. Thus, the choice of a detergent system which will remove all kinds of soils encountered in aluminum processing such as cutting oils and buffing compounds, and which will prevent redeposition of the soils and staining is a difficult problem.

We have now discovered a new cleaning composition for aluminum and aluminum alloys which will clean aluminum contaminated with all kinds of soils without etching the aluminum and which permits the aluminum metal to undergo further chemical processing with nothing further required other than a water rinse. In addition to the above advantages, our composition has been carefully formulated so that it will not undergo caking during storage and shipping and will remain free flowing and readily available for use after long storage periods.

The principal component of our aluminum cleaning composition is alkali metal tetraborate, preferably the sodium or potassium salts because of their availability. The alkali metal tetraborate must be present at least at 35 parts by weight of the solid composition, otherwise there is poor cleaning and soil removal. A principal advantage of the tetraborate is that its provides good detergency at the desired pH of 8 to 10 and in addition, it has inherent buffering ability. The alkali metal tetraborate concentration can be as high as 92 parts by weight, while the preferred concentration is about 70 parts by weight.

The other alkaline detergent which we require in our composition is one or more members of the group known as the alkali metal polyphosphates. The alkali metal polyphosphates are molecularly dehydrated alkali metal phosphates distinguishable from the orthophosphates in that their alkali metal oxide ($M_2O$) to phosphorus pentoxide ($P_2O_5$) ratio is substantially less than three to one, the ratio in the orthophosphate ($M_3PO_4$). The polyphosphates that are applicable to our aluminum cleaning composition have an $M_2O$ to $P_2O_5$ ratio of two to one or less. Examples of suitable alkali metal polyphosphates include tetrasodium pyrophosphate $$(2Na_2O \cdot P_2O_5 \text{ or } Na_4P_2O_7)$$

sodium tripolyphosphate ($5Na_2O \cdot 3P_2O_5$ or $Na_5P_3O_{10}$), sodium hexametaphosphate [$(Na_2O \cdot P_2O_5)_x$ or $Na_2P_2O_6$] and the equivalent water soluble potassium salts. As used throughout the specification and claims, the term alkali metal polyphosphate shall have the meaning herein given. The preferred alkali metal polyphosphate for use in our cleaning compositions is the tetrasodium pryophosphate.

The alkali metal polyphosphates must be present in at least 5 parts by weight of the dry composition and may be present as high as about 35 parts of the dry composition. The preferred proportion is 17 parts by weight of the dry mixture.

The combination of alkali metal tetraborates and alkali metal polyphosphates within the above concentration ranges is the only combintaion of alkaline cleaning agents which we have discovered which will satisfactorily remove soil from aluminum and its alloys and which also has a pH in aqueous solution within the range of 8 to 10, a range that will not seriously corrode or etch the aluminum or leave undesirable deposits on the aluminum being cleaned.

We have found that the hexavalent chromium is the only corrosion inhibitor which is compatable with the particular alkali and detergent system which we have formulated which will not leave a permanent film or stain on the aluminum metal being processed, and in this respect, the hexavalent chromium has a particular advantage over silicates which have heretofore been used for corrosion inhibition of aluminum in cleaning compositions. Even though hexavalent chromium may impart some slight chromium color to the solution, this is readily rinsed by water so that there is no permanent film or color remaining on the metal. The choice of the particular detergents in our cleaning composition assures that the chromium readily rinses off along with the other soil.

We have discovered that at a pH of 10 in aqueous solution there must be present at least 0.5 gram per liter of hexavalent chromium in order to prevent corrosion of the aluminium. At lower pH the amount of hexavalent chromium required to prevent corrosion is not as great. At a pH of 8.5 there is no attack on the aluminum with only 0.05 gram per liter of hexavalent chromium. The hexavalent chromium must be present in the cleaning composition within the range of 0.3 to 4 parts by weight, and is preferably present at 1.8 parts by weight.

The hexavalent chromium may be supplied in the form of chromic acid, alkali metal chromates, alkali metal dichromates or most any source of water soluble hexavalent chromium. Where the term hexavalent chromium is used throughout the specification and claims, we mean hexavalent chromium as supplied in the form of a water soluble dichromate, chromate or chromic acid or anhydride. If 5 parts by weight of hexavalent chromium are specified in a composition, this could be supplied, for example, by 14.1 parts of potassium dichromate or 18.6 parts of potassium chromate.

While the above cleaning composition containing 35 to 92 parts of alkali metal tetraborate, 5 to 35 parts of alkali metal polyphosphate and 0.3 to 4 parts of hexavalent chromium is an effective detergent composition for aluminum in aqueous solution, it will not completely remove all types of soil, especially buffing compounds. Additional cleaning power may be supplied by one or more specific detergents.

We have found that the alkyl aryl sulfonic acids and their alkali metal or ammonium salts are effective detergents in the above cleaning composition. The alkyl aryl sulfonic acids and salts must be present within the range of from 0.5 to 5 parts by weight and are preferably present at 2 parts by weight. The preferred alkyl aryl sulfonate is dodecyl benzene sulfonic acid and is sodium salts, although other aryl sulfonic acids having a $C_8$ to $C_{14}$ alkyl substituent are useful in our cleaning composition. The useful aryl components are benzene and naphthalene. The preferred salts of the alkyl aryl sulfonic acids are the alkali metal and ammonium salts, although other water soluble salts can be used.

Another group of detergents which we have found useful in our cleaning composition are the alkylphenol-ethylene oxide condensation products having the formula

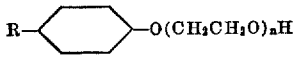

wherein R is an alkyl group having from 6 to 12 carbon atoms, and where n has a value of from 8 to 12. Preferred alkyl substituents are the octyl and nonyl radicals.

Either the alkyl aryl sulfonate or the alkylphenol-ethylene oxide condensation product is effective in the removal of soils such as rolling oils, stamping and forming lubricants, and buffing compounds. Either detergent may be used by itself, or, more effectively, both detergents may be used in the cleaner composition. At least 0.5 part by weight of the alkylpehnol-ethylene oxide condensation product must be present in the dry granular composition and as much as 5 parts will be useful. Any larger concentrations will not provide additional cleaning.

In addition to having the above detergents which are effective in removing various types of soil from the aluminum metal and aluminum alloys, it is desirable and in some cases necessary to have organic detergents present which will prevent redeposition of soil and/or the staining of the aluminum after the soil has been removed. Thus, we have found that the condensed naphthalene sodium sulfonates are particularly effective in preventing the redeposition of soil and in preventing the staining of aluminum. This product will be referred to throughout the specification and claims as condensed naphthalene sodium sulfonate. More specifically, it is the sodium salt of the condensation product of naphthalene sulfonic acid and formaldehyde. This product may be prepared in the maner set forth in U.S. Patent No. 1,336,759. The condensed naphthalene sodium sulfonate may be conveniently purchased under the trade name Tamol N, a product of the Rohm & Haas Company. The condensed naphthalene sodium sulfonate may be used in conjunction with one or more of the above detergents or it may be used without the above detergents. It is most effective, however, when used with one or more of the organic detergents.

It is also desirable that our aluminum cleaning composition have in it a sequestrant to prevent the redeposition of aluminum salts.

Even though our cleaning compositions are formulated to operate at a pH which will not seriously corrode or etch the aluminum and are buffered for long lasting service, some etching of the aluminum will take place. Thus, it is necessary that an aluminum sequestrant be present in the composition. The sequestrant may be used alone with the alkali metal polyphosphate, alkali metal tetraborate and hexavalent chromium, but preferably, it is used with one or all of the organic detergents.

The most useful aluminum sequestrant is sodium gluconate and this must be present in the dry granular composition at a concentration of at least 0.5 part by weight and it may be as high as 5 parts by weight. Preferably the concentration is 1 part by weight. Gluconic acid and the alkali metal salts are also suitable aluminum sequestrants. The gluconic acid and the alkali metal salts thereof are polyhydroxy carboxylic acids and may be characterized by the formula $CH_2OH(CHOH)_nCOOH$, wherein n is 4 for gluconic acid. In other polyhydroxy carboxylic acids which are useful aluminum sequestrants, the n in the above formula may vary from 2 to 6. Suitable hydroxy monobasic acids are sacharric, heptogluconic and gluconic.

Another type of aluminum sequestrant is that represented by the formula $CH_2OH(CHOH)_nCH_2OH$ where n is 2 to 5. Members of this class include sorbitol and mannitol. The preferred polyhydric alcohol for use as a sequestrant for aluminum is sorbitol, which has the formula $CH_2OH(CHOH)_4CH_2OH$.

Another type of aluminum sequestrant which is effective in our cleaning composition is the ethylenediamine tetraacetic acid salts. The tetrasodium and trisodium salts are quite useful as well as the equivalent potassium salts. All of these sequestrants may be used in the dry granular cleaning compositions at a concentration of from 0.5 to 5 parts by weight, and preferably will be at 1 part by weight. The aluminum sequestrants prevent the formation of aluminum salts from depositing on the cleaned aluminum.

Our aluminum cleaning compositions are dissolved in water at concentrations of from 2 to 10 ounces per gallon. Preferably the composition is used at 4 to 5 ounces per gallon, and higher concentrations may be used, depending on the difficulty of removing the particular soil encountered. However, concentrations much in excess of 10 ounces per gallon may not dissolve all of the ingredients and hence are not practical.

The temperature at which the aluminum and aluminum alloys are subjected to in our cleaning bath are from room temperature to about 180° F. Temperatures higher than 180° F. should not be used as there is a tendency for etching of the aluminum to take place at these temperatures. Moreover, higher temperatures accelerate the reversion of the polyphosphates to the orthophosphates. Agitation in the cleaning bath is desirable but not necessary. Agitation can be supplied mechanically or by the use of air.

As mentioned earlier, the selection of alkalis and their ratios was made to obtain a composition which, in aqueous solution, at the useful concentrations, would give a pH within the range of 8 to 10. Preferably, the pH is about 9.2 or 9.3. Within this pH range there is only a little tendency for the alkali to corrode the aluminum.

The cleaning time will vary from 30 seconds to 15 minutes depending on the difficulty of removing the soil. Stamping or cutting oils are readily removed, particularly from 2S aluminum, and normally an immersion time of 30 seconds is all that is required to remove this type of soil. When one is attempting to remove buffing compounds or heavy grease and wax coatings from aluminum, then an immersion time of 15 minutes may be required.

It is a particular advantage of our compositions that the aluminum metal or alloys may proceed to a subsequent chemical treating operation with only an intermediate rinsing operation. A single cold water rinse is all that is required before the metals may proceed to anodizing or brightening operations.

The best mode of using our novel cleaning compositions will be evident from a consideration of the following examples:

The lower concentration limit of alkali metal tetraborate was determined by testing the cleaning of aluminum metal parts at successively lower concentrations of borax in cleaner formulations. The cleaner was dissolved in water at 6 ounces per gallon and the bath operated at 170° F. The aluminum parts were contaminated with cutting oils and buffing compound. The metal parts were observed for completeness of soil removal and for corrosion of the aluminum.

TABLE I

| Sodium Tetraborate, Parts by weight of Cleaner | Soil on Aluminum Sheet | | | | Metal Etching |
|---|---|---|---|---|---|
| | Mineral Oil | | Buffing Compound | | |
| | Removal (in min.) | Rinsing | Removal (in min.) | Rinsing | |
| 70 | 15 | Good | 20 | Good | No attack. |
| 50 | 15 | do | 20 | do | Do. |
| 40 | 10 | do | 25 | do | Do. |
| 35 | 10 | do | 25 | do | Trace attack. |
| 30 | 9 | do | 20 | Fair | Slight attack. |
| 25 | 7 | do | 10 | Poor | Mild attack. |

In the above table the sum of the sodium tetraborate and the tetrasodium pyrophosphate totalled 87 parts by weight of the dry cleaner composition. The remainder of the composition was as follows: Potassium dichromate, 5 parts; condensed naphthalene sodium sulfonate (Tamol N), 2 parts; sodium gluconate, 1 part; alkylphenol-ethylene oxide condensation product (Tergitol NPX), 3 parts;

dodecyl benzene sulfonic acid, 2 parts. Similar results are obtained when potassium tetraborate is substituted for sodium tetraborate.

In a similar manner, the lower limit of alkali metal polyphosphate concentration was determined. In this particular series of tests, the cleaning composition was used at a concentration of 6 ounces per gallon and the concentration of the alkali metal polyphosphate was successively lowered until either cleaning or rinsing was inadequate. The cleaning bath was operated at 170° F. The particular soils that were tested for removal were mineral oil, palm oil and buffing compound.

TABLE II

| Tetrasodium pyrophosphate, Parts by weight of Cleaner | Soil on Aluminum Sheet | | | | | |
|---|---|---|---|---|---|---|
| | Mineral Oil | | Palm Oil | | Buffing Compound | |
| | Removal (in min.) | Rinsing | Removal (in min.) | Rinsing | Removal (in min.) | Rinsing |
| 17.0 | 15 | Good | 10 | Good | 20 | Good. |
| 10.0 | 15 | do | 10 | do | 20 | Do. |
| 7.5 | 18 | Fair | 10 | do | 20 | Do. |
| 5.0 | 20 | do | 10 | do | 20 | Do. |
| 4.0 | 22 | Poor | 10 | do | 22 | Do. |
| 3.0 | 30 | do | 12 | Fair | 25 | Do. |

As in Table I, the sum of the tetrasodium pyrophosphate and sodium tetraborate was 87 parts by weight of the dry granular cleaning composition. The remaining components were present as given in Table I. Tetrapotassium pyrophosphate can be substituted for the sodium salt in the above table with equal efficiency.

Tetrasodium pyrophosphate was compared for cleaning ability with sodium tripolyphosphate and sodium hexametaphosphate at concentrations in water of 6 ounces per gallon and at 170° F. The alkalis were tested for cleaning ability against mineral oil and buffing compounds. The rinsing ability in cold water and the corrosion or staining of the aluminum by the cleaning operation was also observed. These tests are summarized in Table III.

TABLE III

| Cleaner Composition Parts by weight | Effectiveness of Polyphosphate Cleaners | | | |
|---|---|---|---|---|
| | Attack/Staining on buffed 6063 aluminum | Cleaning Ability | | Rinsing (in cold water) |
| | | Mineral Oil (Kendall 50G) | Buffing Compound | |
| 70.0 sodium tetraborate, 17.0 tetrasodium pyrophosphate. | No staining, no attack. | Complete removal in 15 min. | Complete removal in 20 min. | Good. |
| 70.0 sodium tetraborate, 17.0 sodium tripolyphosphate. | No attack, no staining. | do | Complete removal in 22 min. | Do. |
| 70.0 sodium tetraborate, 17.0 sodium hexametaphosphate. | No staining, no attack. | Complete removal in 16 min. | Complete removal in 20 min. | Very good. |

The remaining 13 parts by weight of the composition given in Table III are the same as in Tables I and II.

Various other combination of alkaline detergents were formulated, as shown in Table IV, dissolved in water at 6 ounces per gallon, and then observed for their corrosion of aluminum metal, stability or other effects. In general the formulations would not satisfactorily inhibit corrision. Sometimes where satisfactory corrosion inhibition was obtained, the components were incompatible, as noted by the precipitation in the solution. The precipitation left undesirable deposits on the cleaned metal.

TABLE IV

| Cleaner Composition, Parts by weight | pH | Corrosion of aluminum | Stability |
|---|---|---|---|
| 60.0 sodium tetraborate.<br>25.0 sodium bicarbonate.<br>10.0 tetrasodium pyrophosphate.<br>2.0 Tergitol NPX.[a]<br>2.0 DDBSA.[b]<br>1.0 sodium gluconate. | 9.0 | Moderate. | |
| 60.0 sodium tetraborate.<br>20.0 sodium bicarbonate.<br>15.0 disodium phosphate.<br>2.0 Tergitol NPX.<br>2.0 DDBSA.<br>1.0 sodium gluconate. | 9.05 | Moderate. | |
| 60.0 sodium tetraborate.<br>20.0 sodium bicarbonate.<br>15.0 sodium tripolyphosphate.<br>2.0 Tergitol NPX.<br>2.0 DDBSA.<br>1.0 sodium gluconate. | 8.8 | Moderate. | |
| 60.0 sodium tetraborate.<br>15.0 tetrasodium polyphosphate.<br>15.0 sodium bicarbonate.<br>5.0 sodium silicate.<br>2.0 Tergitol NPX.<br>2.0 DDBSA.<br>1.0 sodium gluconate. | 9.1 | Slight. | Considerable precipitation. |
| 60.0 sodium tetraborate.<br>30.0 tetrasodium pyrophosphate.<br>5.0 sodium silicate.<br>2.0 Tergitol NPX.<br>2.0 DDBSA.<br>1.0 sodium gluconate. | 9.25 | Slight. | Considerable precipitation. |
| 60.0 sodium tetraborate.<br>30.0 monosodium phosphate.<br>5.0 sodium silicate.<br>2.0 Tergitol NPX.<br>2.0 DDBSA.<br>1.0 sodium gluconate. | 9.2 | Very slight. | Considerable precipitation. |
| 60.0 sodium tetraborate.<br>35.0 monosodium phosphate.<br>2.0 Tergitol NPX.<br>2.0 DDBSA.<br>1.0 sodium gluconate. | 8.8 | Considerable. | |
| 60.0 sodium tetraborate.<br>30.0 monosodium phosphate.<br>5.0 sodium fluosilicate.<br>2.0 Tergitol NPX.<br>2.0 DDBSA.<br>1.0 sodium gluconate. | 8.4 | Slight staining severe corrosion at solution/air interface. | Considerable precipitation. |
| 70.0 sodium tetraborate.<br>25.0 monoammonium phosphate.<br>2.0 Tergitol NPX.<br>2.0 DDBSA.<br>1.0 sodium gluconate. | Slowly changing. | Slight at outset, increased as pH changed. | |
| 70.0 sodium tetraborate.<br>25.0 sodium nitrate.<br>2.0 Tergitol NPX.<br>2.0 DDBSA.<br>1.0 sodium gluconate. | | Slight. | |
| 70.0 sodium tetraborate.<br>17.0 tetrasodium pyrophosphate.<br>5.0 potassium dichromate.<br>2.0 Tamol N.[c]<br>3.0 Tergitol NPX.<br>2.0 DDBSA.<br>1.0 sodium gluconate. | 9.3 | None. | Clear solution. |

[a] Tergitol NPX—an alkyl phenol-ethylene oxide condensate having the formula

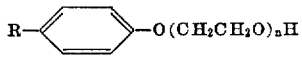

where R is an alkyl group having from 6 to 12 carbon atoms and where n has a value of from 8 to 12, manufactured by Carbide & Carbon Chemical Corporation.

[b] DDBSA—90% solution of dodecylbenzenesulfonic acid, manufactured by Monsanto Chemical Co.

[c] Tamol N—condensed naphthalene sodium sulfonate, manufactured by Rohm & Haas Company.

The minimum amount of hexavalent chromium necessary to inhibit the corrosion of an alkali metal tetraborate-alkali metal pyrophosphate cleaner system on aluminum metal was determined by varying the pH of a cleaner composition used at a concentration of 4 ounces per gallon of water and then observing the effect of the solution on buffed aluminum immersed in the aqueous cleaner system at 170° F. for 10 minutes. The pH of the solution was adjusted where necessary by the addition of sodium hydroxide. Hexavalent chromium was added to the cleaner system at the various levels indicated in Table V by the addition of computed amounts of potassium dichromate. The amount of corrosion was observed after a 10 minute immersion.

In Table V the chromium was added to the following composition:

| | Percent |
|---|---|
| Sodium tetraborate | 73.8 |
| Tetrasodium pyrophosphate | 17.9 |
| Sodium gluconate | 1.05 |
| Condensed naphthalene sodium sulfonate (Tamol N) | 2.10 |
| Alkyl phenol-ethylene oxide condensation product (Tergitol NPX) | 3.16 |
| Dodecylbenzenesulfonic acid | 2.10 |

Various detergents and detergent combinations were added to a boraxtetrasodium pyrophosphate cleaner system to determine the effect on removal of buffing com-

TABLE V

| $Cr^{+6}$ Concentration, gm./liter | Hexavalent Chromium Content versus pH<br>Attack on Aluminum at pH— | | | | | | |
|---|---|---|---|---|---|---|---|
| | 8.5 | 9.0 | 9.5 | 9.75 | 10.0 | 10.2 | 10.5 |
| 0.025 | Slight | Slight | Considerable. | Considerable. | Considerable. | Considerable. | Considerable. |
| 0.05 | None | Trace | do | do | do | do | Do. |
| 0.075 | do | None | Slight | Slight | do | do | Do. |
| 0.1 | do | do | do | do | Slight | do | Do. |
| 0.2 | do | do | do | do | do | Slight | Mild. |
| 0.3 | do | do | None | None | do | do | Slight. |
| 0.4 | do | do | do | do | do | do | Do. |
| 0.5 | do | do | do | do | None | do | Do. |
| 0.6 | do | do | do | do | do | None | Do. |

pound from aluminum metal. See Table VI. The removal of the buffing compound was observed by immersing 6063 aluminum which had been buffed with buffing compound. The immersion was at 150° F. for 10 minutes with the cleaner concentration at 4 ounces per gallon of water and at a pH of 9.0. The percentage of detergent given is the percentage of a cleaner composition composed of 60 parts of sodium tetraborate, 20 parts of tetrasodium pyrophosphate and 20 parts of sodium bicarbonate.

TABLE VI

| Detergent System | Percent by weight of cleaner system | Amount of Buffering Compound Nu-Spra-Glu [a] Removed, percent |
|---|---|---|
| Alkylphenol ethylene oxide condensation product, Tergitol NPX [b] | 2 | 90 |
| Alkylphenol ethylene oxide condensation product, Tergitol NPX | 4 | 100 |
| Alkylphenol ethylene oxide condensation product, Tergitol NPX | 2 | 90 |
| Condensed naphthalene sulfonate, Tamol N [c] | 1 | |
| Dodecylbenzenesulfonic acid | 5 | 95 |
| Alkylphenol ethylene oxide condensation product, Tergitol NPX | 2 | 100 |
| Dodecylbenzenesulfonic acid | 2 | |
| Dodecylbenzenesulfonic acid | 2 | 85 |
| Condensed naphthalene sulfonate, Tamol N | 1 | |
| Condensed naphthalene sulfonate, Tamol N | 5 | 85 |
| Lauryl sodium sulfate, Duponol WA [d] | 5 | 90 |
| Alkylphenol ethylene oxide condensation product, Tergitol NPX | 3 | |
| Alkylphenol ethylene oxide condensation product, Tergitol NPX | 2 | 100 |
| Dodecylbenzenesulfonic acid | 3 | |
| Condensed naphthalene sulfonate, Tamol N | 1 | |
| Lauryl sodium sulfate, Duponol WA | 1 | 50 |
| Lauryl sodium sulfate, Duponol WA | 5 | 07 |
| Neutral sodium salt of tall oil acid, Dresinate TX [e] | 5 | 10 |
| Neutral sodium salt of tall oil acid, Dresinate TX | 20 | 75 |
| Sodium salt of a sulfated primary amine condensed with ethylene oxide, Triton QS-15 [f] | 1 | 50 |
| Sodium salt of a sulfated primary amine condensed with ethylene oxide, Triton QS-15 | 5 | 60 |
| Alkanolamine condensate Emcol 5130 [g] | 1 | 50 |
| Alkanolamine condensate, Emcol 5130 | 5 | 55 |

[a] Manufactured by J. J. Siefer Company.
[b] Manufactured by Carbide and Carbon Chemical Corp.
[c] Manufactured by Rohm & Haas Company.
[d] Manufactured by E. I. du Pont de Nemours & Co.
[e] Manufactured by Hercules Powder Company.
[f] Manufactured by Rohm & Haas Company.
[g] Manufactured by Emulsoa Chemical Corporation.

The effectiveness of various sequestering agents was determined by observing the redeposition of soil and/or staining of aluminum 6063 immersed at 170° F. with various cleaner compositions at 6 ounces per gallon of water concentration. The sequestrant was used at 1% concentration and the soils involved were Kendall 50G mineral oil and Nu-Spra-Glu buffing compound.

TABLE VII

| Sequestrant, percent by weight | Attack/staining on buffed 6063 aluminum | Cleaning Ability | | Rinsing in cold water |
|---|---|---|---|---|
| | | Mineral Oil (Kendall 50G) | Nu-Spra-Glu [a] Buffing Compound | |
| Sodium gluconate, 1.0 | No redeposition of soil. No staining. No attack. | Complete removal in 15 min. | Complete removal in 20 min. | Good. |
| Sorbitol, 1.0 | do | do | do | Do. |
| Ethylenediamine tetraacetic acid tetrasodium salt, 1.0. | do | do | do | Do. |

[a] Manufactured by J. J. Siefer Company.

The remainder of the cleaner compositions used in the above tests was as follows:

| | Percent |
|---|---|
| Sodium tetraborate | 70 |
| Tetrasodium pyrophosphate | 17 |
| Potassium dichromate | 5 |
| Tamol N | 2 |
| Tergitol NPX | 3 |
| Dodecylbenzenesulfonic acid | 2 |

Having thus described our invention we claim it as follows, in which all parts given are parts by weight.

We claim:

1. A composition for cleaning aluminum and its alloys in aqueous solution consisting essentially by weight of an alkali metal tetraborate—35 to 92 parts, an alkali metal polyphosphate—5 to 35 parts, [a] water soluble hexavalent chromium *supplied in the form of a water soluble* compound selected from the group consisting of chromic acid, alkali metal chromates and alkali metal dichromates—0.3 to 4 parts, and at least one organic detergent selected from the group consisting of a sodium salt of a sulfonated condensation product of naphthalene and formaldehyde, an alkyl aryl sulfonic acid and its alkali metal salts in which the alkyl group is $C_8$ to $C_{14}$, the aryl group is benzene and naphthalene, and an alkyl phenol-ethylene oxide condensate having the formula

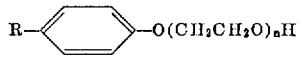

where R is an alkyl group having from 6 to 12 carbon atoms and where n has a value of from 8 to 12—0.5 to 5 parts.

2. The composition of claim 1 together with 0.5 to 5 parts of an aluminum sequestrant selected from the group consisting of a polyhydroxy carboxylic acid having the formula $$CH_2OH(CHOH)_nCOOH$$

where n is 2 to 5, and its alkali metal salts, a polyhydric alcohol of the formula $$CH_2OH(CHOH)_nCH_2OH$$

where n is 2 to 5, and ethylenediamine tetraacetic acid and its alkali metal salts.

3. A composition for cleaning aluminum and its alloys in aqueous solution consisting essentially by weight of an alkali metal tetraborate—35 to 92 parts, an alkali metal polyphosphate—5 to 35 parts, [a] water soluble hexavalent chromium *supplied in the form of a water soluble* compound selected from the group consisting of chromic acid, alkali metal chromates and alkali metal dichromates—0.3 to 4 parts, 0.5 to 5 parts each of the organic detergents selected from the group consisting of a sodium salt of a sulfonated condensation product of naphthalene and formaldehyde, an alkyl aryl sulfonic acid in which the alkyl group is $C_8$ to $C_{14}$ and the aryl group is benzene and naphthalene, and their alkali metals salts, and an alkyl phenol-ethylene oxide condensate having the formula

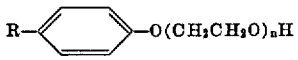

where R is an alkyl group having from 6 to 12 carbon atoms and where n has a value of from 8 to 12, and 0.5 to 5 parts of an aluminum sequestrant selected from the group consisting of a polyhydroxy carboxylic acid having the formula $$CH_2OH(CHOH)_nCOOH$$

where n is 2 to 5, and its alkali metal salts, a polyhydric alcohol of the formula $$CH_2OH(CHOH)_nCH_2OH$$

where is is 2 to 5, and ethylenediamine tetraacetic acid and its alkali metal salts.

4. A composition for cleaning aluminum and its alloys in aqueous solution consisting essentially by weight of sodium tetraborate—35 to 92 parts, tetrasodium pyrophosphate—5 to 35 parts, [a] water soluble hexavalent chromium *supplied in the form of a water soluble* compound selected from the group consisting of chromic acid, alkali metal chromates and alkali metal dichromates—0.3 to 4 parts, at least one organic detergent selected from the group consisting of a sodium salt of a sulfonated condensation product of naphthalene and formaldehyde, an alkyl aryl sulfonic acid in which the alkyl group is $C_8$ to $C_{14}$ and the aryl group is benzene and naphthalene and its alkali metal salts, and an alkyl phenol-ethylene oxide condensate having the formula

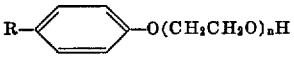

where R is an alkyl group having from 6 to 12 carbon atoms and where n has a value of from 8 to 12—0.5 to 5 parts, and an aluminum sequestrant selected from the group consisting of a polyhydroxy carboxylic acid having the formula $$CH_2OH(CHOH)_nCOOH$$

where n is 2 to 5 and its alkali metal salts, a polyhydric alcohol of the formula $$CH_2OH(CHOH)_nCH_2OH$$

where n is 2 to 5, and ethylenediamine tetraacetic acid and its alkali metal salts—0.5 to 5 parts.

5. A composition for cleaning aluminum and its alloys in aqueous solution consisting essentially by weight of sodium tetraborate—35 to 92 parts, tetrasodium pyrophosphate—5 to 35 parts, [a] water soluble hexavalent chromium *supplied in the form of a water soluble* compound selected from the group consisting of chromic acid, alkali metal chromates and alkali metal dichromates—0.3 to 4 parts, together with 0.5 to 5 parts each of the organic detergent selected from the group consisting of a sodium salt of a sulfonated condensation product of naphthalene and formaldehyde, an alkyl aryl sulfonic acid in which the alkyl group is $C_8$ to $C_{14}$ and the aryl group is benzene and naphthalene, and its alkali metal salts, and an alkyl phenol-ethylene oxide condensate having the formula

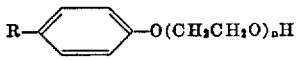

where R is an alkyl group having from 6 to 12 carbons atoms and where n has a value of from 8 to 12, and 0.5 to 5 parts of an aluminum sequestrant selected from the group consisting of a polyhydroxy carboxylic acid having the formula $$CH_2OH(CHOH)_nCOOH$$

where n is 2 to 5, and its alkali metal salts, a polyhydric alcohol of the formula $$CH_2OH(CHOH)_nCH_2OH$$

where n is 2 to 5, and ethylene diamine tetraacetic acid and its alkali metal salts.

6. A composition for cleaning aluminum and its alloys in aqueous solution consisting essentially by weight of

| | Parts |
|---|---|
| sodium tetraborate | 70 |
| tetrasodium pyrophosphate | 17 |
| potassium dichromate | 5 |
| sodium gluconate | 1 |
| a sodium salt of a sulfonated condensation product of naphthalene and formaldehyde | 2 |
| dodecylbenzenesulfonic acid | 2 |
| an alkyl phenol-ethylene oxide condensate having the formula 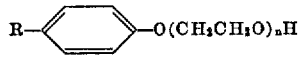 where R is an alkyl group having from 6 to 12 carbon atoms and where n has a value of from 8 to 12 | 3 |

References Cited

The following references, cited by the Examiner, are of record in the patented file of this patent or the original patent.

UNITED STATES PATENTS

| | | | |
|---|---|---|---|
| 1,336,754 | 4/1920 | Schmidt | 260—67 |
| 1,962,821 | 6/1934 | Kochs | 252—135 |
| 1,967,393 | 7/1934 | Calcott et al. | 252—138 XR |
| 2,741,599 | 4/1956 | McDonald et al. | 252—138 |
| 2,986,526 | 5/1961 | Crowther | 252—135 |
| 3,039,970 | 6/1962 | Krueger et al. | 252—135 |

LEON D. ROSDOL, *Primary Examiner.*

S. D. SCHWARTZ, *Assistant Examiner.*

U.S. Cl. X.R.

148—6.15, 6.16; 156—21; 252—79.4, 135, 138